(12) United States Patent
Champion

(10) Patent No.: US 6,550,510 B2
(45) Date of Patent: Apr. 22, 2003

(54) OPTIMIZED DEMOUNTABLE FLANGE AND RETAINING RING GEOMETRY FOR AIRCRAFT WHEELS

(75) Inventor: Jon H. Champion, Granger, IN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/887,837

(22) Filed: Jun. 22, 2001

(65) Prior Publication Data

US 2002/0129884 A1 Sep. 19, 2002

Related U.S. Application Data

(60) Provisional application No. 60/276,740, filed on Mar. 16, 2001.

(51) Int. Cl.⁷ .......................... B60C 25/00; B60B 21/00
(52) U.S. Cl. .................. 152/410; 152/409; 301/35.3
(58) Field of Search .................. 152/379.3, 379.4, 152/379.5, 396, 409, 410, 405; 244/103 R; 301/35.3

(56) References Cited

U.S. PATENT DOCUMENTS

| | | | |
|---|---|---|---|
| 3,599,698 A | 8/1971 | Skehan | 152/410 |
| 3,623,530 A | 11/1971 | Beyers | 152/410 |
| 3,645,316 A | 2/1972 | Verdier | 152/410 |
| 3,882,919 A | 5/1975 | Sons, Jr. | 152/410 |
| 3,995,676 A | 12/1976 | Casey | 152/410 |
| 4,043,375 A | 8/1977 | Casey | 157/1 |
| 4,209,052 A | 6/1980 | French | 152/410 |
| 4,438,797 A | 3/1984 | Suckow | 152/410 |
| 4,530,387 A | 7/1985 | Osawa | 152/410 |
| 4,552,194 A | 11/1985 | Brown | 152/410 |
| 4,554,961 A | 11/1985 | Osawa | 152/410 |
| 4,574,859 A | 3/1986 | Smith | 152/410 |
| 4,635,695 A | 1/1987 | Frank | 152/410 |
| 4,649,978 A | 3/1987 | McCoy | 152/410 |
| 4,683,930 A | 8/1987 | Elam | 152/410 |
| 4,706,723 A | 11/1987 | Loeber | 152/410 |
| 4,721,142 A | 1/1988 | Foster | 152/410 |
| 4,757,851 A | 7/1988 | Van Den Abeele | 152/410 |
| 4,911,216 A | 3/1990 | Yamoto | 152/410 |
| 5,086,821 A | 2/1992 | Russell | 152/410 |
| 5,259,430 A | 11/1993 | Smith | 152/410 |
| 5,476,128 A | 12/1995 | Jankowski | 152/409 |

FOREIGN PATENT DOCUMENTS

| | | |
|---|---|---|
| EP | 0 438 719 | 7/1991 |
| GB | 211921 | 3/1924 |
| JP | 61-166701 | 7/1986 |

*Primary Examiner*—S. Joseph Morano
*Assistant Examiner*—Long Bao Nguyen
(74) *Attorney, Agent, or Firm*—Larry J. Palguta

(57) ABSTRACT

A technique for reducing the likelihood of fatigue damage to a wheel rim assembly (11) of the type having an annular wheel rim (13) with a first bead flange (19), a second separable bead flange (15, 21), and a retaining ring (17) disposable within a groove (35) in the wheel rim to secure the separable bead flange to the wheel rim includes forming the retaining ring to have an annular bead (41), a portion of which has an arcuate cross-sectional configuration by shaping the annular bead, in cross-section, as at least two tangentially joined circular segments (43, 45) of unequal radii (27, 29). Contact between the retaining ring and the wheel rim is limited to the arcuate portion as the sole contact region between retaining ring and wheel rim. The separable bead flange is formed to have a concave retaining ring engaging annular surface (25) which, in cross section has a finite radius of curvature (59) and the retaining ring is formed to have a separable bead flange engaging convex annular surface (23) which, in cross-section, has a finite radius of curvature (61). Each radius of curvature (59, 61) is constant throughout the respective engaging surfaces.

18 Claims, 5 Drawing Sheets

OPTIMIZED DEMOUNTABLE FLANGE AND RETAINING RING GEOMETRY FOR AIRCRAFT WHEELS

CROSS-REFERENCE TO RELATED APPLICATIONS

This application claims the benefit of U.S. Provisional Application No. 60/276,740 filed Mar. 16, 2001 and entitled OPTIMIZED DEMOUNTABLE FLANGE AND RETAINING RING GEOMETRY FOR AIRCRAFT WHEELS

BACKGROUND OF THE INVENTION

1. Field of the Invention

The present invention relates to aircraft wheels of the type having a rim for supporting a pneumatic tire, and more particularly to an improved fatigue reducing rim configuration and technique.

2. Description of the Related Art

In one form, a typical wheel rim for aircraft may include a rim body having an integral inboardly positioned tire bead flange, a demountable separable outboardly positioned tire bead flange, a split lock ring seated within an annular groove in the rim body and, perhaps, an arrangement associated with the lock ring to maintain it on the wheel rim independent of tire inflation. In wheel rim assemblies of this type, a deflated tire is firstly mounted on the rim body and it is followed by the demountable bead flange which is moved inboardly on the rim body such that the split lock ring may be seated within the annular groove provided for it proximate the outboard edge of the rim body. Upon inflation of a mounted tire, the demountable bead flange is moved outboardly on the rim and into forceful engagement with the split lock ring. Frequently, the lock ring or retaining ring and separable bead flange have mating conical tapers and the outward motion of the separable bead flange urges, by way of the engaged conical tapers, the retaining ring radially inwardly into the retaining ring annular groove. These conical tapers are flat, that is, they are surfaces of revolution of a straight line. Alternatively, when the tire is to be demounted from the rim, it is firstly deflated and the demountable bead flange is moved inboardly to disengage the lock ring. The split lock ring may then be removed from within its mounting groove and the demountable bead flange and deflated tire removed from the rim body in the outboardly direction. Demountable flange aircraft wheel designs are currently used for applications such as military aircraft wheels. These designs are low mileage wheels. It is desirable to provide demountable flange wheels for nonmilitary wheel applications. Military demountable flange wheels can exhibit fatigue problems if used for longer life nonmilitary applications. Load is transmitted, for example, from the tire by way of the separable bead flange and retaining ring to the groove in the wheel rim. Frequently, stress problems appear near the base of the wheel rim groove or in the removable flange where it contacts the retaining ring. Such tensile stresses in the groove in the rim body can cause fracturing and an early retirement of the wheel rim. Additional material in the high stress regions can eliminate the problem, but only at the expense of added weight detracting from the aircraft payload. The present invention improves the demountable flange and retaining ring geometries without increasing wheel weight to minimize fatigue damage and enables the use of demountable flange wheels for nonmilitary wheel applications.

SUMMARY OF THE INVENTION

The present invention provides an optimization of the geometry for demountable flange wheels. This invention incorporates curved contact surfaces for the interface between the demountable flange and retaining ring to direct the flange loads more efficiently into the wheel. This invention also uses a compound radius between the retaining ring and wheel to distribute the directed load as a uniform contact stress. The result is the elimination of fatigue (crack initiation) in the retaining ring radius and the minimization of fretting fatigue between the demountable flange and retaining ring, and between the retaining ring and wheel.

The invention comprises, in one form thereof, a tire receiving wheel rim assembly having an annular wheel rim with a first bead flange, a second separable bead flange, and a retaining ring which may be placed within a groove in the wheel rim engaging both the wheel rim and a region of the separable bead flange to secure the separable bead flange to the wheel rim and retain an inflated tire between the bead flanges. The region of engagement between the separable bead flange and retaining ring has abutting annular surfaces, each of which, in cross-section, has a finite radius of curvature. The abutting portion of the retaining ring annular surface may be convex and the abutting portion of the separable bead flange surface concave. Both radii of curvature are constants and the radius of curvature of the separable bead flange surface exceeds the radius of curvature of the retaining ring surface. The region of engagement between the separable bead flange and retaining ring is limited to the abutting annular surfaces and the separable bead flange and retaining ring are otherwise spaced apart from one another.

An advantage of the present invention is that the magnitude of stresses is reduced significantly increasing wheel life without increasing wheel weight.

BRIEF DESCRIPTION OF THE DRAWINGS

A more complete understanding of the present invention will become apparent from the following description taken in conjunction with the accompanying drawings.

Corresponding reference characters indicate corresponding parts throughout the several drawing views.

DETAILED DESCRIPTION OF THE PREFERRED EMBODIMENT

Figure 1:
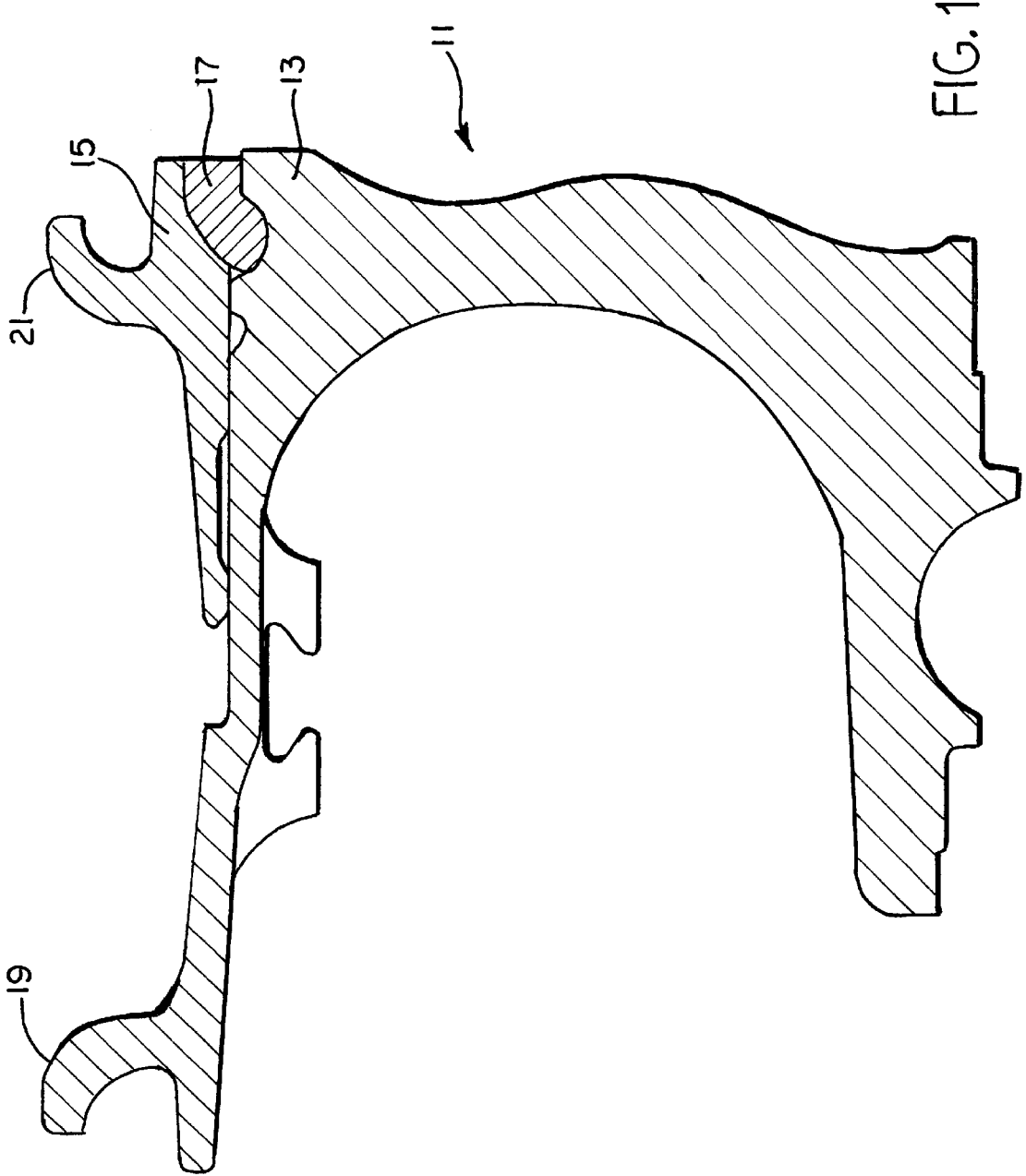
FIG. 1 is a view, in cross-section of a portion of a pneumatic tire receiving wheel rim assembly according to the invention in one form; illustration of the present invention.

Referring now to the drawings and particularly to FIG. 1, there is shown an illustrative aircraft wheel rim assembly 11 having an annular rim portion of generally U-shaped cross-sectional configuration for receiving a pneumatic tire. The rim portion is formed by the wheel rim 13, a separable annular flange 15 and a split retaining ring 17. The wheel has a central hub portion adapted to be journalled to an axle (not shown) for rotation about the wheel axis. It will be understood that the cross-sectional view of FIG. 1 represents the top half of the wheel rim assembly which is rotatable about an axle axis located beneath the drawing sheet and that the wheel rim assembly is a solid of revolution about that axis. That axis lies in the plane of the cross-section. The rim portion of the wheel 11 which mates with the tire has radially outwardly extending flanges such as 19 and 21 at the radially outermost extent of the wheel rim assembly.

In prior art wheel assemblies, the retaining ring and separable bead flange have mating conical (straight) tapers. With such mating straight surfaces, the forces tend to migrate or accumulate near one end or the other of the contact region forming stress peaks or spikes hastening stress induced fatigue.

The present invention incorporates curved contact surfaces 23 (which is convex) and 25 (which is concave) for the interface between the demountable flange 15 and retaining ring 17 to direct the flange loads more efficiently into the wheel. The invention also uses a compound radius 27, 29 and 31, 33 between the retaining ring 17 and annular wheel rim 13 to distribute the directed load as a uniform contact stress. The retaining ring annular surface compound radius may be formed of more than two distinct radii as discussed in conjunction with FIG. 8. The result is the elimination of fatigue (crack initiation) in the retaining ring radius and the minimization of fretting fatigue between the demountable flange 15 and retaining ring 17, and between the retaining ring 17 and wheel rim 13.

Figure 2:
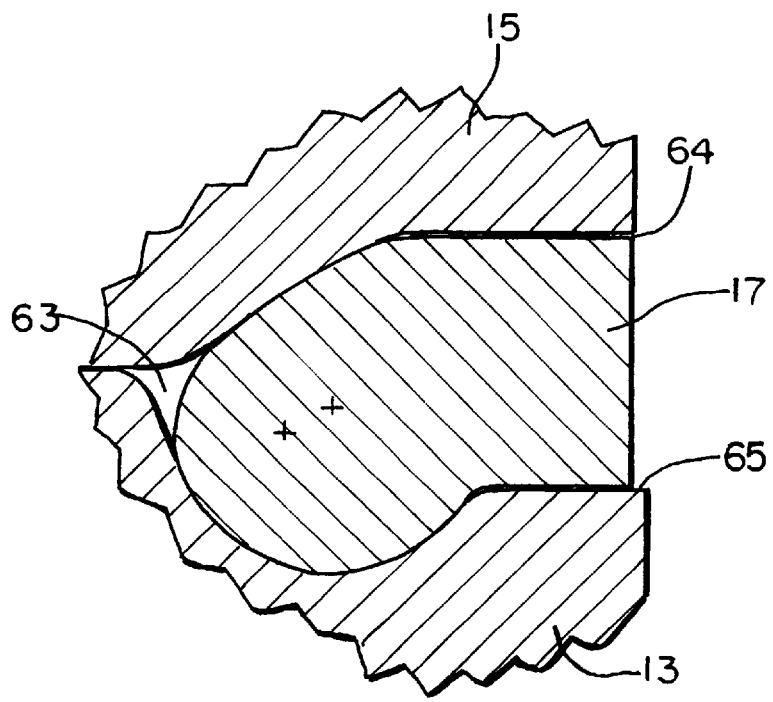
FIG. 2 is a cross-sectional view of a portion of the of wheel rim assembly of FIG. 1.

FIG. 2 is an enhanced view, in cross-section, of a portion of FIG. 1 emphasizing the regions of engagement between the retaining ring 17 and wheel rim 13, and the retaining ring 17 and removable or separable bead flange 15. Note there is little or no engagement in the gaps or regions 63, 64, 65 and 66.

Figure 3:
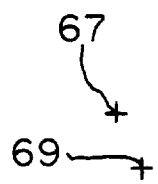
FIG. 3 is a cross-sectional view of the annular wheel rim portion of FIGS. 1 and 2 emphasizing the retaining ring receiving groove.
Figure 3:
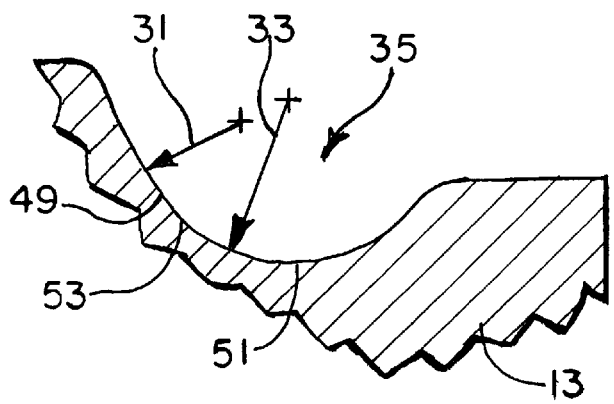

FIG. 3 shows the wheel rim 13 portion of FIG. 2. The groove 35 is a retainer ring groove and comprises one of the abutting surfaces of FIG. 2, The cross-sectional surface of the groove 35 may be formed by the two tangentially joined circular segments 49 and 51 which blend tangentially at 53. These segments 49 and 51 are of unequal radii 31 and 33 respectively. The abutting surface 41 of the retaining ring 17 may similarly be formed as two or more tangentially joined circular segments as illustrated in FIG. 4.

Figure 4:
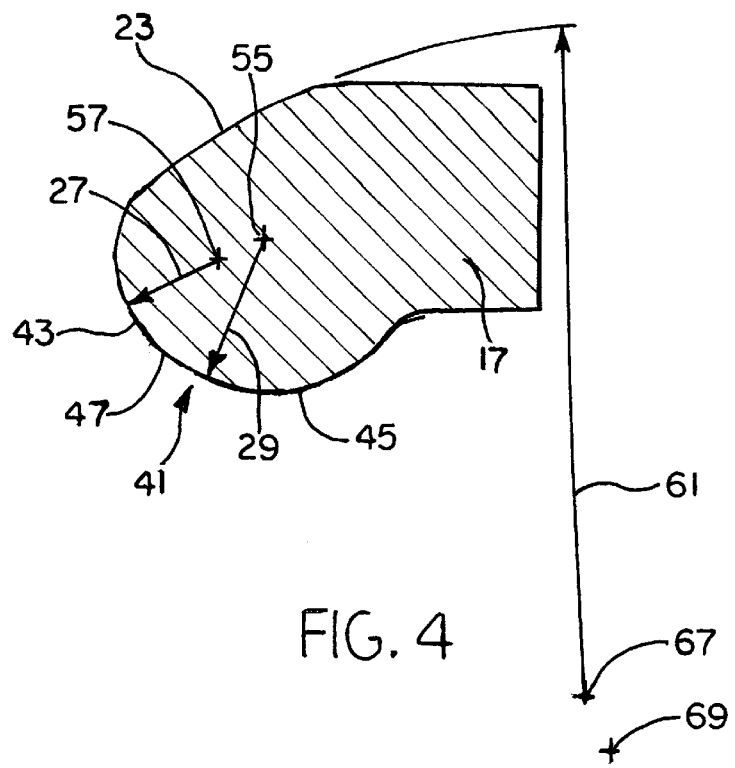
FIG. 4 is a cross-sectional view of the retaining ring of FIGS. 1 and 2.

FIG. 4 illustrates the surface 41 as being formed by the two tangentially joined circular segments 43 and 45 which have respective centers 55 and 57 of are located within the retaining ring 17. The circular segment 43, which is of a smaller radius 27, extends tangentially at 47 from the circular segment 45, which has the greater radius 29, and extends generally inboardly toward the first bead flange 19 of FIG. 1.

Figure 5:
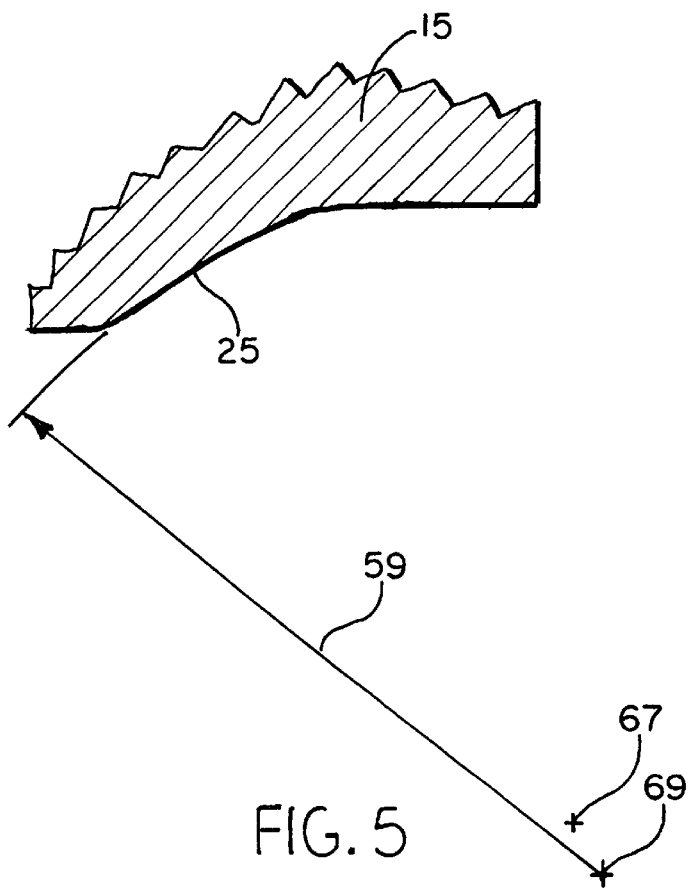
FIG. 5 is a cross-sectional view of a portion of the wheel rim assembly of FIGS. 1 and 2 emphasizing the separable bead flange.

Comparing FIGS. 4 and 5, the retaining ring 17 engages the separable bead flange 15 along abutting annular surfaces 23 and 25. Each of these annular surface, in cross-section, has a constant finite radius of curvature, 59 for the separable bead flange and 61 for the retaining ring. The radius of curvature 59 of the separable bead flange surface, which is centered at 69, is greater than the radius of curvature 61 of the retaining ring surface, which has its center at 67, thereby allowing the surfaces to blend gently into the region of contact.

Figure 6:
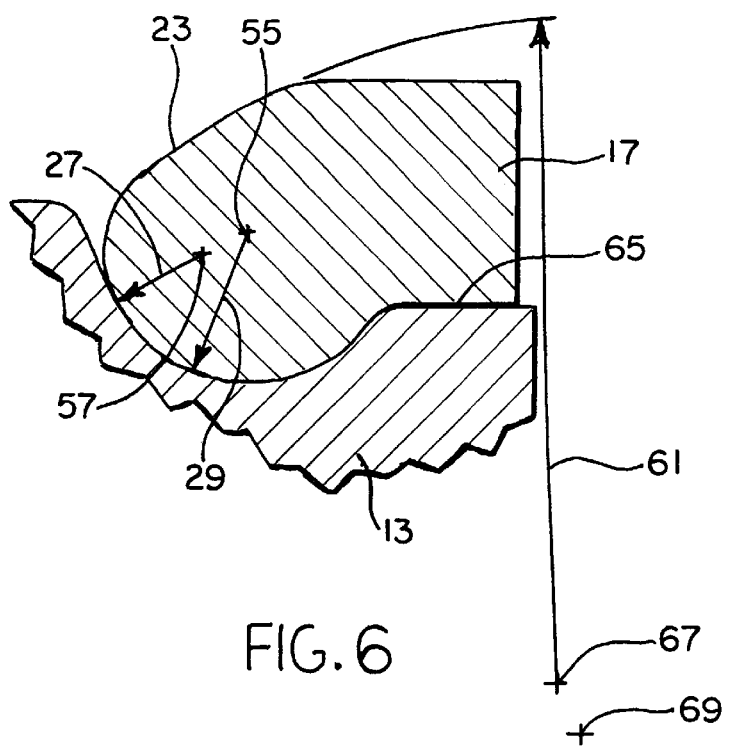
FIG. 6 is a cross-sectional view of a portion of the wheel rim assembly of FIGS. 1 and 2 showing the interengagement of the annular wheel rim portion and retaining ring.

In FIG. 6 the retaining ring 17 is seated in the wheel rim groove 35 with the abutting annular surfaces disposed entirely within the groove 35. The centers 55 and 57 of the two tangentially joined circular segments 45 and 43 which have the unequal radii 29 and 27, respectively, are shown. These two segments are tangentially blended together at 47. Centers for the radii 31 and 33 do not necessarily coincide with 57 and 59 since the radii forming surface 41 typically differ from those forming surface 35 to achieve the desired gentle separation forming gaps 63 and 65.

Figure 8:
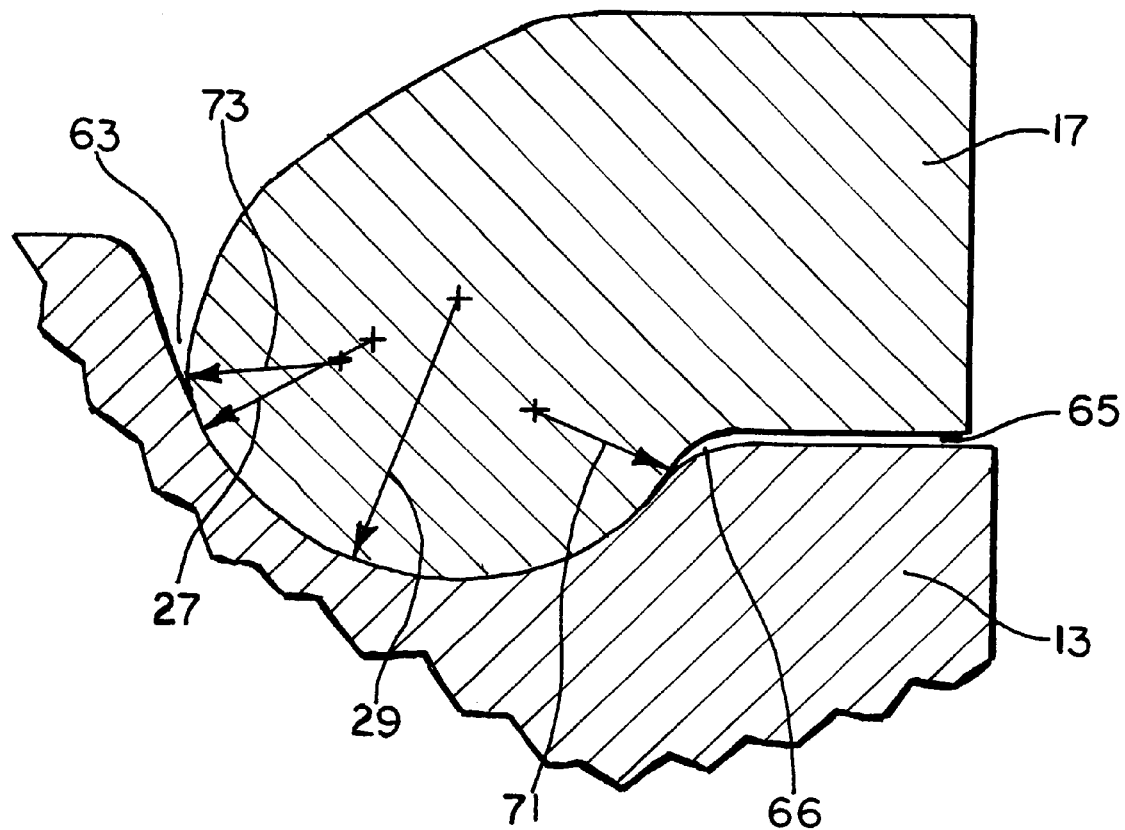
FIG. 8 is an enlarged cross-sectional view of a portion of the wheel rim assembly similar to FIG. 6 showing one technique for achieving a gradual feathering of contact between the annular wheel rim portion and retaining ring.

One technique for achieving a gradual feathering of the contact between the wheel rim 13 and retaining ring 17 is shown in FIG. 8. Here, the radii 31 and 33 are substantially the same as radii 27 and 29 respectively. Gradual separation is achieved by making the retaining ring compound surface curve of more than two circular segments. Three or more segments may be employed. Three segments are employed in one presently preferred embodiment. In that preferred embodiment, the arcuate cross-sectional configuration of the annular bead 41 of the retaining ring is formed as three tangentially joined circular segments with the intermediate circular segment having the largest radius 29 which is greater than either 27 or 71. Gap 66 of gradual separation between the surfaces is obtained by tangentially joining the surfaces of radii 29 and 71. Similarly, a gradual gap 63 may optionally be made to occur because of the tangential joining of surface curves of radii 29 and 73. Of course, the surfaces may be other than of circular cross-sections to avoid abrupt separation and accompanying stress concentration. If the two curved surfaces 35 and 41 are of equal radii throughout, stresses tend to accumulate at the outermost regions of contact. Blending of the surfaces moves the stresses away from the end regions and distributes it more uniformly along the region of contact.

Figure 7:
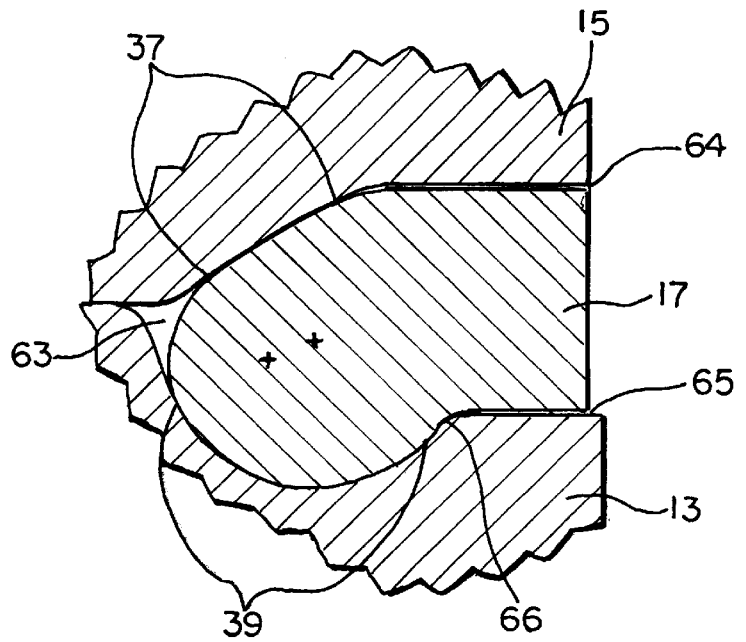
FIG. 7 is a cross-sectional illustration of the location and distribution of stresses related to a wheel rim, demountable flange, and retaining ring according to the present invention.

Comparing FIGS. 6 and 7, the region of engagement between the wheel rim and retaining ring consists of the abutting annular surfaces 35, 41, the wheel rim and retaining ring being otherwise spaced apart from one another as at 63 and 65. The region 39 of engagement between the wheel rim and retaining ring is formed by abutting annular surfaces 35 and 41 and constitutes a region of uniformly distributed stress. The region of engagement 37 between the separable bead flange and retaining ring consists of the abutting annular surfaces 23, 25, the separable bead flange and retaining ring being otherwise spaced apart from one another as at 64 and 64.

The compound radius technique which is employed to gently separate the wheel rim 13 and the retaining ring 17 could be applied to the region of contact between the retaining ring and separable flange 15. Similarly, the dissimilar radii technique employed to gently separate the retaining ring from the separable flange could be applied to the region of contact between the retaining ring and the wheel flange. Also, more complex curves having multiple or continuously varying radii of curvature could also be employed, however, the respective techniques described are the presently preferred techniques.

The wheel assembly components are feathered away from one another generally tangentially at the extremities of their contact regions so as to be spaced apart where high tensile stresses have occurred in prior art wheel assemblies and shaped to yield reduced levels and more uniform or better distributed stresses.

Alternate embodiments may be devised without departing from the spirit or the scope of the invention.

What is claimed is:

1. A method of reducing the likelihood of fatigue damage to a wheel rim assembly of the type having an annular wheel rim with a first bead flange, a second separable bead flange, and a retaining ring disposable within a groove in the wheel rim to secure the separable bead flange to the wheel rim, comprising:

forming the retaining ring to have an annular bead, a portion of which has an arcuate cross-sectional configuration; and limiting contact between the retaining ring and the wheel rim to the arcuate portion as the sole contact region between retaining ring and wheel rim, the wheel rim and retaining ring being otherwise spaced from one another.

2. The method of claim 1 wherein the step of forming includes shaping the annular bead, in cross-section, as at least two tangentially joined circular segments of unequal radii.

3. A wheel rim assembly for receiving a tire having an annular wheel rim with a first bead flange, a second separable bead flange, and a retaining ring disposable within a groove in the wheel rim to engage both the wheel rim and a region of the separable bead flange to secure the separable bead flange to the wheel rim and retain an inflated tire between the first and second bead flanges, the region of engagement between the separable bead flange and retaining ring comprising abutting annular surfaces, each annular surface, in cross-section, having a finite radius of constant curvature, the radius of curvature of the separable bead flange surface exceeding the radius of curvature of the retaining ring surface.

4. The wheel rim assembly of claim 3, wherein the abutting portion of the retaining ring annular surface is convex, and the abutting portion of the separable bead flange surface is concave.

5. The wheel rim assembly of claim 3, wherein the region of engagement between the separable bead flange and retaining ring consists of the abutting annular surfaces, the separable bead flange and retaining ring being otherwise spaced apart from one another.

6. A wheel rim assembly for receiving a tire having an annular wheel rim with a first bead flange, a second separable bead flange, and a retaining ring disposable within a groove in the wheel rim to engage both a region of the wheel rim and the separable bead flange to secure the separable bead flange to the wheel rim and retain an inflated tire between the first and second bead flanges, the region of engagement between the wheel rim and retaining ring comprising abutting annular surfaces which, in cross-section, separate from one another at points of tangency between the two surfaces at each of the two opposite extremities of the region of engagement.

7. The wheel rim assembly of claim 6 wherein the abutting annular surfaces lie entirely within the groove of the wheel rim.

8. The wheel rim assembly of claim 6, wherein at least one of the abutting annular surfaces, in cross-section, comprises at least two tangentially joined circular segments of unequal radii.

9. The wheel rim assembly of claim 8, wherein both abutting annular surfaces comprise, in cross-section, at least two tangentially joined circular segments of unequal radii.

10. The wheel rim assembly of claim 8, wherein the centers of the at least two tangentially joined circular segments are located within the retaining ring.

11. The wheel rim assembly of claim 8, wherein the circular segment of lesser radius extends tangentially from the circular segment of greater radius generally toward the first bead flange.

12. The wheel rim assembly of claim 6, wherein the retaining ring engages the separable bead flange along abutting annular surfaces, each annular surface, in cross-section, having a constant finite radius of curvature with the radius of curvature of the separable bead flange surface exceeding the radius of curvature of the retaining ring surface.

13. The wheel rim assembly of claim 12, wherein the region of engagement between the separable bead flange and retaining ring consists of the abutting annular surfaces, the separable bead flange and retaining ring being otherwise spaced apart from one another.

14. The wheel rim assembly of claim 6, wherein the region of engagement between the wheel rim and retaining ring consists of the abutting annular surfaces, the wheel rim and retaining ring being otherwise spaced apart from one another.

15. A method of reducing the likelihood of fatigue damage to a wheel rim assembly of the type having an annular wheel rim with a first bead flange, a second separable bead flange, and a retaining ring disposable within a groove in the wheel rim to secure the separable bead flange to the wheel rim, comprising:

forming the separable bead flange to have a retaining ring engaging annular surface which, in cross section, has a finite radius of curvature;

forming the retaining ring to have a separable bead flange engaging annular surface which, in cross-section, has a finite radius of curvature, and to have an annular bead, a portion of which has an arcuate cross-sectional configuration; and limiting contact between the retaining ring and the wheel rim to the arcuate portion as the sole contact region between retaining ring and wheel rim.

16. The method of claim 15, wherein each radius of curvature is constant throughout the respective engaging surfaces.

17. The method of claim 15, wherein the retaining ring engaging annular surface of the separable bead flange is concave and the separable bead flange engaging annular surface of the retaining ring is convex.

18. The method of claim 15, wherein the step of forming the retaining ring to have an annular bead includes forming the arcuate cross-sectional configuration as three tangentially joined circular segments with the intermediate circular segment having the largest radius.

* * * * *